Aug. 3, 1965 R. E. McKINNEY 3,198,395
APPARATUS FOR DISCHARGING BULK MATERIAL FROM BINS
Filed April 15, 1964 4 Sheets-Sheet 1
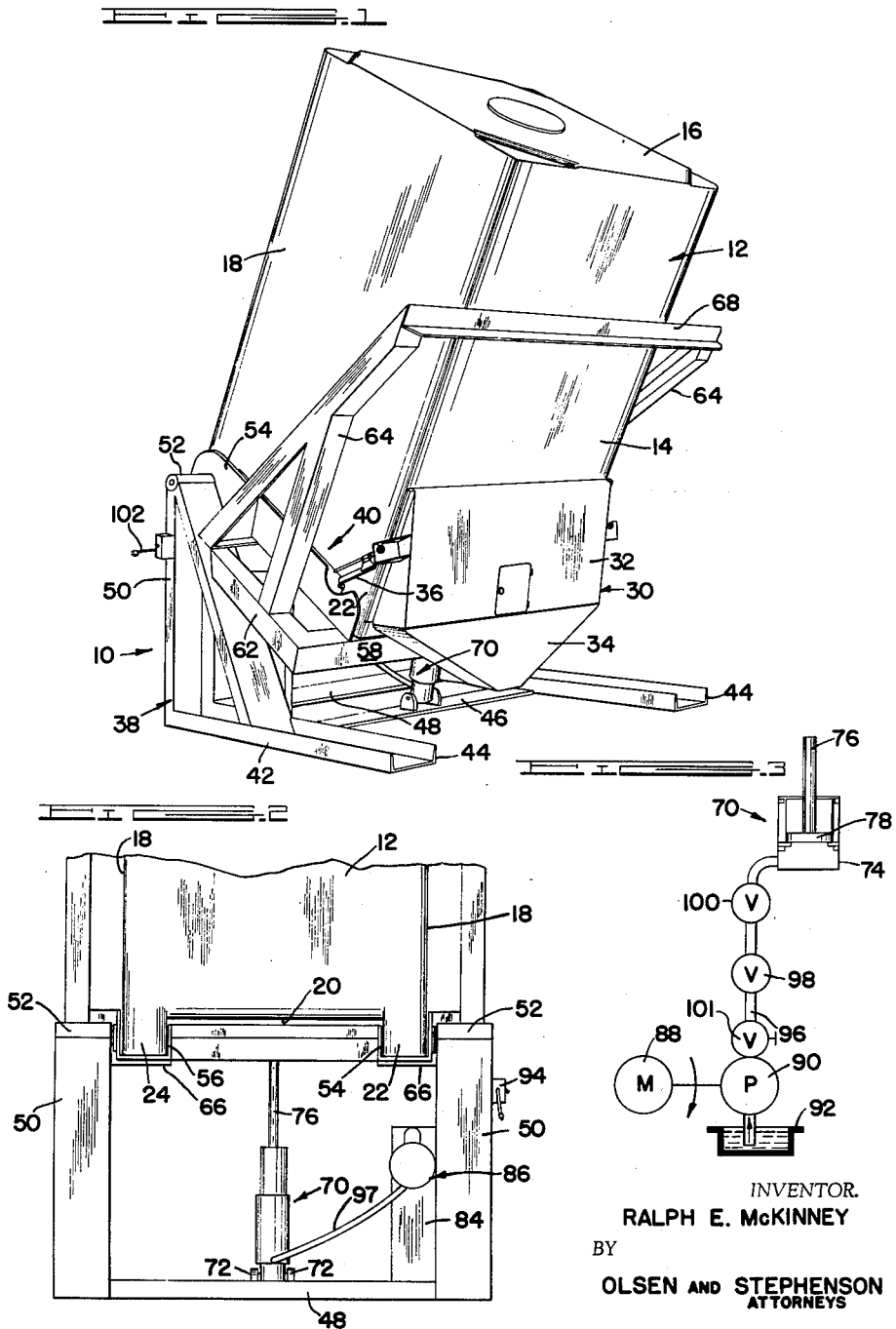
INVENTOR.
RALPH E. McKINNEY
BY
OLSEN AND STEPHENSON
ATTORNEYS Aug. 3, 1965   R. E. McKINNEY   3,198,395
APPARATUS FOR DISCHARGING BULK MATERIAL FROM BINS
Filed April 15, 1964   4 Sheets-Sheet 2
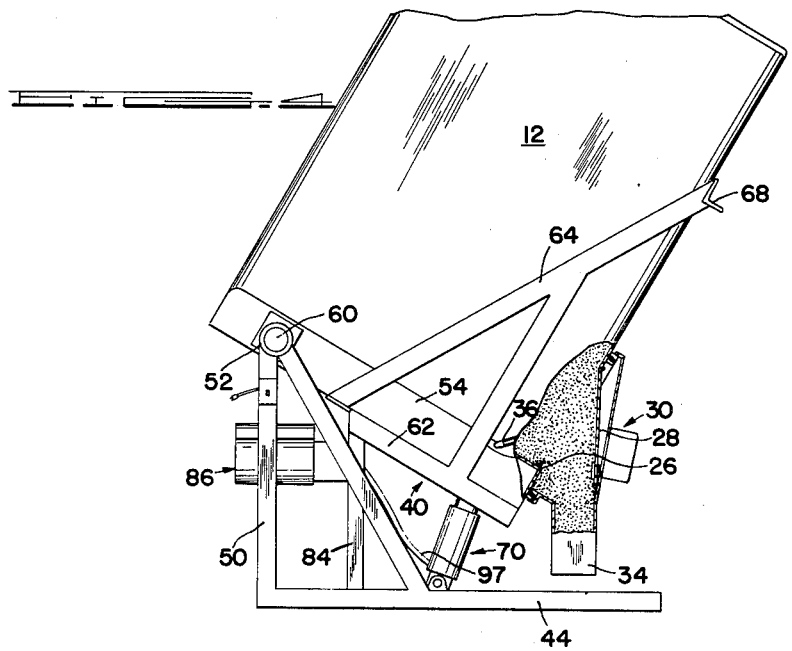
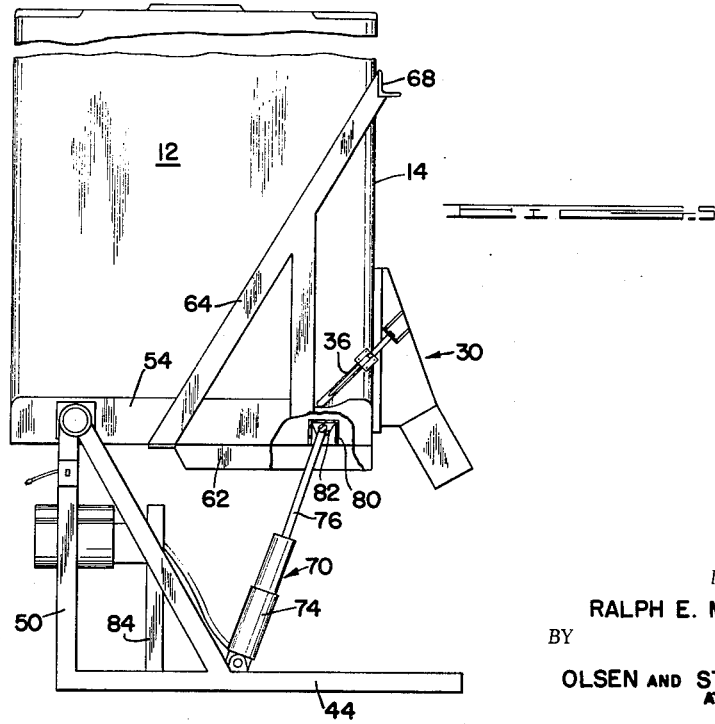
*INVENTOR.*
RALPH E. McKINNEY
BY
OLSEN AND STEPHENSON
ATTORNEYS

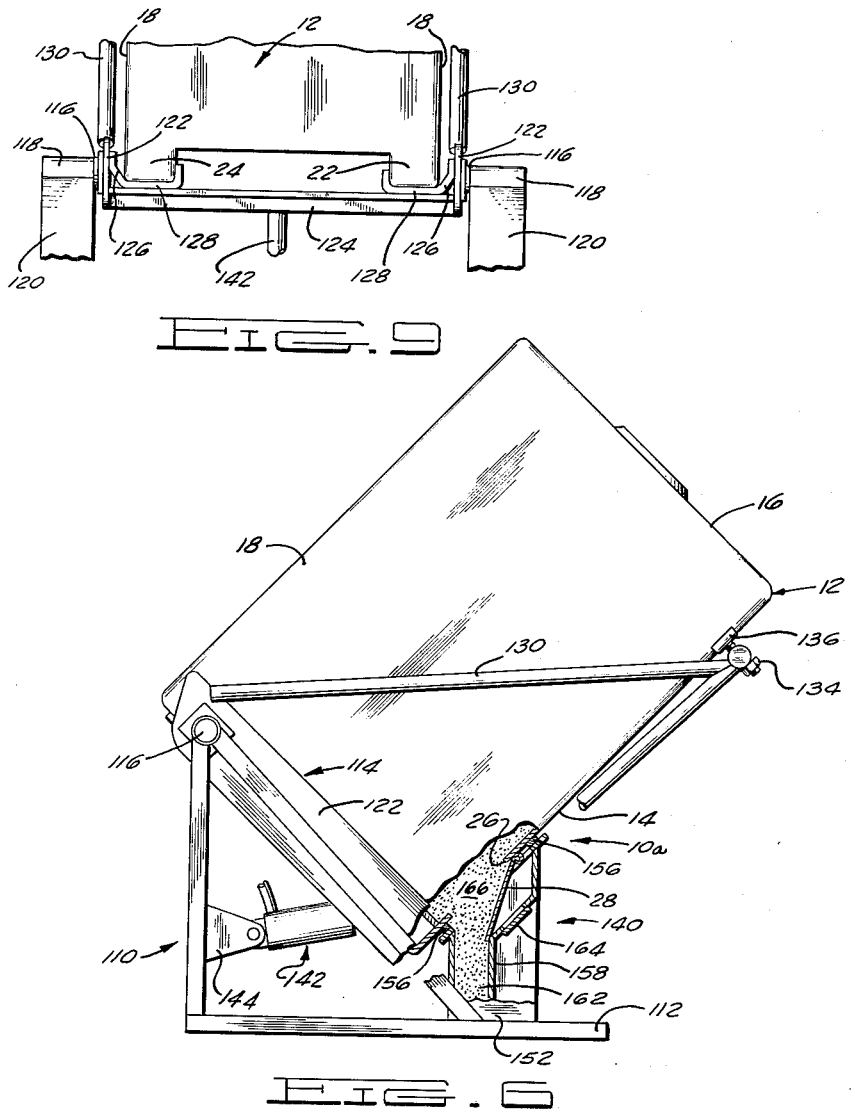

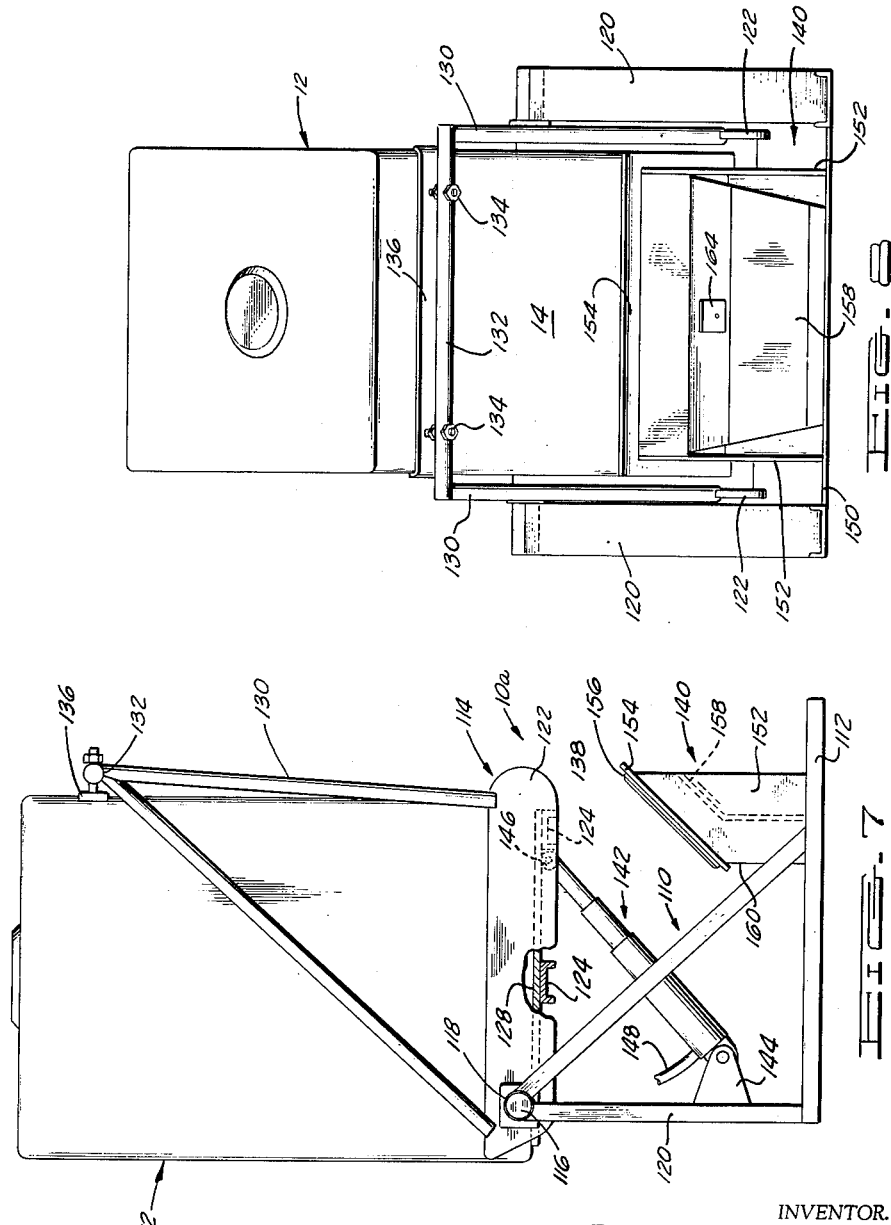

United States Patent Office 3,198,395
Patented Aug. 3, 1965

3,198,395
APPARATUS FOR DISCHARGING BULK
MATERIAL FROM BINS
Ralph E. McKinney, Beatrice, Nebr., assignor to Hoover Ball and Bearing Company, Saline, Mich., a corporation of Michigan
Filed Apr. 15, 1964, Ser. No. 360,010
4 Claims. (Cl. 222—166)

This invention relates generally to bulk material handling systems and more particularly to apparatus for discharging bulk material from a transportation and storage bin. This application is a continuation-in-part of my copending application, Serial No. 202,124, filed June 13, 1962, now forfeited.

The apparatus of this invention relates particularly to bulk material handling systems utilizing bins of the type shown in U.S. Patent No. 2,648,428, which have bulk material discharge openings in their front side walls. Various equipment has been devised for removing material from bins of this type, and this equipment is entirely satisfactory for most purposes. However, most of this equipment requires substantially permanent installation in a given location and requires the use of high capacity power equipment capable of lifting a loaded bin upwardly to a tipped position. In some systems, inexpensive portable apparatus, utilizing less expensive and lighter duty power equipment, for discharging material from bins of this or similar types is desirable. It is an object of this invention, therefore, to provide simple portable apparatus for discharging bulk material from bins.

It is well known that in most plants having bulk material handling systems, fork lift trucks and the like are readily available for transporting and lifting items such as material storage bins. In the apparatus of this invention, such equipment is utilized to lift a loaded bin onto a pivoted cradle which consists of a framework having an open rear end which is unobstructed so that the bin can be moved horizontally into a supported position on the framework. The open rear end of the frame is fixed to permanent pivots so that the forward end of the cradle can be lowered to tip the bin forwardly to a position in which the bin contents can be discharged through the bin discharge opening. A hydraulic cylinder assembly is provided for returning the forwardly tipped cradle to a substantially horizontal position, once the bin has been emptied. Since the hydraulic cylinder assembly may only be required to lift the cradle when an empty bin is supported thereon, it can be of a small capacity compared to the requirements for lifting the cradle when a fully loaded bin is supported thereon. However, if lifting of the cradle with a full bin thereon is required, a larger capacity cylinder assembly can be used.

It is a further object of this invention, therefore, to provide apparatus for discharging bulk material from a transportation and storage bin which utilizes a power operated extensible assembly that is retracted to lower a loaded bin and is extended to lift an empty bin.

Another object of this invention is to provide improved apparatus of the above described type which is usable with either a fixed hopper or a bin mounted portable hopper into which the bin contents are discharged.

Still a further object of this invention is to provide apparatus for tipping to discharge a bulk material storage bin which is simple to manufacture, makes provision for positively supporting a bin so that it cannot be accidentally tipped off the apparatus, and is readily operated to move a loaded bin to a discharge position and an empty bin to a position for removal.

Further objects, features and advantages of this invention will become apparent from a consideration of the following description, the appended claims, and the accompanying drawing in which:

FIGURE 1 is a perspective view of one form of the apparatus of this invention, showing the apparatus in a bin tipping position with a bin supported thereon and having a portable hopper attached thereto;

FIGURE 2 is a foreshortened rear elevational view of the apparatus of FIG. 1, showing the apparatus in a bin loading position and with a bin supported thereon;

FIGURE 3 is a diagrammatic view of the hydraulic assembly in the apparatus of this invention;

FIGURE 4 is a side elevational view of the assembly shown in FIG. 1 with some parts broken away for the purpose of clarity;

FIGURE 5 is a side elevational view of the assembly shown in FIG. 4, showing the apparatus in a bin loading position;

FIGURES 6 and 7 are views corresponding to FIGS. 4 and 5, respectively, of another form of the apparatus of this invention employing a fixed hopper;

FIGURE 8 is a front elevational view of the apparatus in the tipped position shown in FIG. 6; and FIGURE 9 is a fragmentary rear elevational view of the apparatus shown in FIGS. 6 and 7, with the apparatus in the position shown in FIG. 7.

With reference to the drawing, the bin discharging apparatus of this invention, indicated generally at 10, is shown in FIG. 1 with a bin 12 supported thereon and in a position in which the bin 12 is tipped forwardly to a discharge position. The bin 12 is of the type shown in U.S. Patent No. 2,648,428, assigned to the assignee of this application, and has a front wall 14, a top wall 16, side walls 18, a bottom wall 20, a first pair of supporting legs 22 which extend downwardly from the bottom wall 20 adjacent one of the side walls 18, and a second pair of supporting legs 24 which extend downwardly from the bottom wall 20 adjacent the other side wall 18 and in a transversely spaced relation with the legs 22. The bin 12 also has a discharge opening 26 formed in its front side wall 14 at a position adjacent the bottom wall 20, and a door 28 which is hingedly mounted at its upper end on the front wall 14 for movement between a position closing the opening 26 and a forwardly pivoted open position.

The bin 12 shown in FIGS. 1, 4 and 5, is provided with a portable hopper unit 30 which includes a body portion 32 that has an open rear side which receives material from the bin 12 through the discharge opening 26, a converging spout portion 34 connected to the body portion 32, and clamp assemblies 36 which connect the hopper unit 30 to the bin 12. The hopper unit 30 is described in detail in copending application, Serial No. 194,916, filed May 15, 1962, and assigned to the assignee of this application, and is therefore not described in detail herein. As shown in FIGS. 1 and 4, when the apparatus 10 is moved to its bin tipping position, the spout portion 34 of the hopper unit 30 is substantially vertical for discharging the bin contents at a localized point into a receptacle, a conveyor, or the like.

The apparatus 10 includes a stand 38 and a cradle 40 which is pivotally supported on the upper end of the stand 38 for up and down pivotal movement. The stand 38 includes a base 42 which consists of a pair of transversely spaced legs 44 which are connected intermediate their ends by a strap 46 and at their rear ends by an angle 48. A substantially inverted V-shape frame 50 is secured to and extended downwardly from each of the legs 44 adjacent the rear end thereof. The upper end of each of the frames 50 supports an elongated tubular bearing 52 and the bearings 52 are substantially axially aligned, for a purpose to appear presently.

The cradle 40 is in the form of an upwardly extending framework which is completely open and unobstructed at its rear end so that the bin 12 can be freely moved onto and off the framework through the open rear end. A pair of transversely spaced channel shape track members 54 and 56, which are open on their top sides, are connected at their forward ends by a cross frame member 58 which is secured to the undersides of the tracks 54 and 56. As shown in FIG. 2, the tracks 54 and 56 are spaced apart a distance corresponding substantially to the spacing of the legs 22 and 24 on the bin 12 so that the bin 12 can be supported on the cradle 40 in a position in which the legs 22 are slidably supported in the track 54 and the legs 24 are slidably supported in the track 56. Adjacent their rear ends, tracks 54 and 56 are secured to oppositely directed axially aligned shafts 60, only one of which is shown, which are rotatably supported in the tubular bearings 52.

The connecting frame member 58 at the forward ends of the tracks 54 and 56 is of a length such that it extends beyond the outer edges of the tracks 54 and 56 and at its ends carries rearwardly extending short frame members 62. Each of the frame members 62 supports an upwardly extending frame unit 64 which is also secured by L-shape brace members 66 to the adjacent track member 54 or 56. The upper ends of the frame units 64 are connected by a frame member 68 which, in the substantially horizontal position of the cradle member 40 shown in FIG 5, is in substantially vertical alignment with the front ends of tracks 54 and 56.

A hydraulic cylinder assembly 70, of a well known type, has a cylinder 74 which is pivotally supported at its lower end on a pair of ears 72 secured to and projecting upwardly from the base strap 46. The assembly 70 also includes a piston 78 and a telescoping piston rod 76 which is connected at its upper end to a bracket 80 which extends between the tracks 54 and 56 and has depending ears 82 positioned substantially midway between the tracks 54 and 56. The upper end of piston rod 76 is pivotally connected to the ears 82.

A supporting plate 84 on the stand 38 supports a motor, pump and reservoir unit 86 which, as shown diagrammatically in FIG. 3, includes an electric motor 88, a pump 90 driven by the motor 88, and a fluid reservoir 92. A switch 94, operable to start and stop the motor 88, is conveniently mounted on one of the frames 50. The pump 90 is connected to the cylinder 74 in the hydraulic cylinder assembly 70 by a passage 96 which includes a flexible conduit 97. A pair of speed control check valves 98 and 100 are interposed in the passage 96. The valve 98 controls the rate of flow of fluid in passage 96 when fluid is being supplied to the hydraulic cylinder assembly 70. The valve 100 is a two position valve and in one position controls the rate of flow of fluid in passage 96 when fluid is flowing in a reverse direction to retract the cylinder assembly 70 and provide for lowering of the cradle 40 from its FIG. 4 position to its FIG. 5 position. In its other position, the valve 100 blocks flow of fluid in this direction and thus acts as a check valve in the event of motor failure to hold the cylinder assembly 70 in its extended position.

In the operation of the apparatus 10 shown in FIGS. 1–5 assume that the cradle 40 is in its substantially horizontal bin loading position shown in FIG. 5 and does not have a bin 12 supported thereon. A fork lift truck or the like (not shown) is then manipulated so that the forks on the truck are engaged with the bottom wall 20 of a bin 12 at a position between the legs 22 and 24 and the wheeled portion of the truck is positioned behind the bin 12. The bin is lifted to a level such that the legs 22 and 24 are substantially horizontally aligned with the tracks 54 and 56 and the fork is moved forwardly through the unobstructed space at the rear end of cradle 40 to a position in which the bin front wall 14 is in contact with or adjacent the frame member 68. The fork is then lowered and moved out of a supporting relationship with the bin bottom wall 20 so that the legs 22 and 24 are supported on the tracks 54 and 56, respectively.

In this position of the cradle 40, the cylinder assembly 70 is extended, as shown in FIG. 5, and the valve 100 prevents flow of fluid out of the cylinder assembly 70 to the tank 92 so that the cylinder assembly 70 is in effect locked in its extended position. To lower the bin 12 to its discharge position shown in FIG. 4, the valve 100 is manually moved to a position such that fluid from the cylinder assembly 70 can flow therethrough at a rate determined by the setting of the valve 100. The cylinder assembly 70 then slowly retracts by virtue of the weight of the bin 12 thereon to its position shown in FIG. 4, during which time the cradle 40 pivotally moves downwardly from its substantially horizontal position shown in FIG. 5 to its downwardly and forwardly inclined lower limit position shown in FIG. 4. During such movement, in the event the bin front wall 14 was spaced slightly from the frame member 68, the bin 12 slides forwardly in the tracks 54 and 56 to a position in which the bin front wall 14 engages the frame member 68 as shown in FIG. 4. The cylinder assembly 74 has a lower limit stop position, as shown diagrammatically in FIG. 3, in which it supports the cradle 40 in its position shown in FIG. 4. The bin 12 is then discharged by opening the door 28 so that the material therein flows into the hopper 30 for discharge through the spout 34.

When the bin 12 has been fully discharged, and it is desired to remove the empty bin 12 from the apparatus 10, the switch 94 is actuated to start the motor 88 so that the pump 90 is operated to pump fluid from the reservoir 92 through the speed control valve 98 and the valve 100 into the cylinder assembly 70 so as to extend the cylinder assembly. The setting of the valve 98 determines the rate at which fluid flows therethrough so that the cradle 40 is moved upwardly at a uniform rate. The valve 100 is moved to a position in which it prevents reverse flow of fluid and when the cylinder assembly 74 has been extended to its position shown in FIG. 5, switch 94 may be actuated to shut off the motor 88 so that the cylinder assembly 74 is again hydraulically locked in its position shown in FIG. 5 or the assembly 70 can be dimensioned such that it has an upper limit position in which the cradle 40 is substantially horizontal. Since the bin 12 is empty during this extension of the cylinder assembly 70, the force required to move the cradle 40 to its FIG. 5 position is substantially reduced relative to that which would be required if the bin 12 were filled. The bin 12 can then be removed by use of a fork lift truck which is manipulated so that the fork thereon is moved forwardly between the frames 50 and raised into engagement with the bin lower wall 20 at a position between the bin legs 22 and 24. The bin 12 is then moved rearwardly through the open rear end of the cradle 40 to remove the bin from the cradle. When it is desired to unload a second bin, the cradle 40 is in its bin loading position shown in FIG. 5 in position to receive another bin.

Since the stand 38 is self-supporting, by virtue of the base legs 44, and since the cylinder assembly 70 and the motor pump and reservoir unit 86 are mounted directly on the apparatus 10, the apparatus 10 can be readily transported to a desired location in a plant, it being only necessary that a source of electrical power be available for the unit 86. To facilitate this connection, a plug 102 is electrically connected to the switch 94.

The apparatus shown in FIGS. 6–8, inclusive, and indicated generally at 10a, is similar to the apparatus 10 previously described, and is illustrated with the bin 12 mounted thereon. The apparatus 10a includes a stand 110 having a base 112 and an open rear end cradle 114 which is secured to shafts 116 that are rotatably supported in aligned tubular bearings 118 carried by the stand 110. A pair of substantially inverted V-shape frames 120 are secured to the base 112 and extend upwardly therefrom so that they are in a transversely spaced relation as shown in FIG. 8.

The cradle 114 is in the form of an upwardly extending framework which is completely open and unobstructed at its rear end so that the bin 12 can be freely moved onto and off the framework through the open rear end. A pair of transversely spaced cradle side members or tracks 122 are disposed between the stand frames 120 and are connected by cross braces 124. Each of the track members 122 has an upwardly and outwardly inclined portion 126 (FIG. 9) and a substantially horizontal supporting portion 128 which extends inwardly toward the other track member 122. As shown in FIG. 9, the track members 122 are spaced apart a distance corresponding substantially to the spacing of the legs 22 and 24 on the bin 12 so that the bin 12 can be supported on the cradle 114 in a position in which the legs 22 and 24 are slidably supported on the track portions 128. During movement of a bin 12 onto the cradle 114 from a fork lift truck, the inclined track portions 126 guide the bin legs 22 and 24 onto the track portions 128 during the time the bin 12 is being lowered onto the cradle 114.

Adjacent their rear ends, the track members 122 are secured to the oppositely directed axially aligned shafts 116 which are rotatably supported in the tubular bearings 118. A substantially inverted V-shaped pipe frame unit 130 is secured to each of the track members 122 so that it extends upwardly therefrom as shown in FIG. 7. A connecting pipe 132 is secured to and extended between the upper ends of the pipe units 130. A pair of adjustable bolt assemblies 134 mounted on spaced portions of the connecting pipe 132 carry an elongated frame plate 136 which is engageable with the bin front wall 14 at a position above the bin opening 26 to prevent the bin 12 from falling off the cradle 114 when the cradle 114 is moved to its forwardly tipped bin discharging position shown in FIG. 6. The bolt assemblies 134 are adjustable to position the plate 136 in substantially vertical alignment with the front ends 138 of the horizontal track portions 128. The cradle 114, with the track members 122 and the frame plate 136, constitutes a bin supporting and locating means for positioning the bin in a predetermined position with respect to a fixed hopper unit 140 disposed below the bin 12 in the position of the bin shown in FIG. 7.

A telescoping hydraulic cylinder assembly 142, of well known type, like the cylinder assembly 70 previously described, is pivotally supported at one end on a member 144 secured to the stand 110. The opposite end of cylinder assembly 142 is pivotally connected to an ear 146 secured to the front cross frame member 124 on the cradle 114. The flexible conduit 148 is connected at one end to the cylinder assembly 142 and at the opposite end to a motor, pump and reservoir unit (not shown) identical to the unit 86 which has been previously described and which is mounted on the stand 110. On release of fluid from the cylinder assembly 142, when it is in its extended position shown in FIG. 7, it is movable to a retracted position to permit downward swinging movement of the cradle 114 to its position shown in FIG. 6. On a supply of fluid under pressure to the cylinder assembly 42, when it is in its retracted position as shown in FIG. 6, it is extensible to its position shown in FIG. 7 to move the cradle 114 upwardly about the pivot shafts 116 to the substantially horizontal position of the track members 122 illustrated in FIG. 7.

In the operation of the apparatus 10a, it is located in a fixed position with respect to the hopper unit 140. In other words, the hopper unit 140 may be fixed to a floor surface, in which case the stand 110 is located in a predetermined position with respect to the hopper 140 so that the hopper 140 is fixed with respect to the cradle 114, or, as shown in the drawing, the hopper unit 140 may be mounted on a plate 150 which is connected to and forms a part of the base 112 in the stand 110. Such an arrangement fixes the position of the hopper 140 relative to the cradle 114 so that the hopper 140 is referred to as a "fixed hopper."

The hopper unit 140 has a pair of end plates 152 which support an upwardly inclined face plate 154 on which a gasket 156 is mounted. The gasket 156 surrounds and defines an upper end inlet opening for the hopper 140 which has a back plate 158 and a front plate 160 which function to channel material dumped into the upper end of the hopper to a discharge portion 162 of the hopper 140. A screw conveyor (not shown) may be disposed in the hopper portion 162 or this portion 162 may communicate with any other kind of suitable conveyor.

Assume that a bin 12 has been moved to a supported position on the cradle 114 as shown in FIG. 7, and that it is desired to discharge the contents of the bin 12. Fluid is released from the cylinder assembly 142 so that the cradle 114 swings downwardly about the axis of the shafts 116 to the position shown in FIG. 6. The hopper unit 140 is positioned so that when the cradle 114 is in its FIG. 6 position, referred to herein as a bin discharge position, a lower portion of the bin front wall 14 surrounding the bin discharge opening 26 sealingly engages the gasket 156, as shown in FIG. 6. An access door 164 in the hopper unit back wall 158 is then opened to provide access to the latch (not shown) on the bin door 28. The bin door 28 is then opened so that the bin contents, indicated at 166, flow downwardly into the hopper unit 140 for travel into the hopper unit portion 162 from which the contents are removed. After the bin 12 has been emptied, the cylinder assembly 142 is extended to lift the cradle 114 to the position shown in FIG. 7 from which the bin 12 can be readily removed by fork lift truck and another loaded bin can be substituted therefor on the cradle 114.

It can thus be seen by virtue of the location of the fixed hopper unit 140 relative to the cradle 114, when the cradle 114 is swung downwardly, the bin 12 is dropped downwardly to a position in which the bin opening 26 is in a discharge position with respect to the hopper 140. In this position, the gasket 156 engages the bin front wall 14 at a position around the opening 26 so as to provide for a substantially dust free discharge station. It is to be understood that the portable hopper 30 and the fixed hopper 140 are usable interchangeably with the apparatus 10 and 10a. In other words, the fixed hopper 140 may be mounted on the stand 38 in the apparatus 10, in which case a bin 12 without a portable hopper 30 attached thereto is mounted on the cardle 40 for the apparatus 10. Likewise, the portable hopper 30 may be mounted on a bin 12 which is supported on the cradle 114 in the apparatus 10a, in which no fixed hopper 140 is used. In all cases, the apparatus of this invention provides for a downward tipping movement of the bin, when it is loaded, to a discharge position thereby eliminating the necessity for lifting the bin to discharge its contents.

It will be understood that the apparatus for discharging bulk material from bins which is herein disclosed and described is presented for purposes of explanation and illustration and is not intended to indicate limits of the invention, the scope of which is defined by the following claims.

What is claimed is:

1. In combination with a bin having a bottom end and a front wall having a discharge opening adjacent said bottom end, apparatus for tipping to discharge the contents of said bin comprising an upwardly extending stand, a cradle having bin supporting and locating means having front and rear ends, said supporting and locating means being located at the lower end of said cradle and having said bin bottom end supported thereon between said front and rear ends, said rear end being unobstructed so that said bin is freely movable onto and off said supporting and locating means through said rear end, pivot members secured to said cradle adjacent said rear end of said bin supporting and locating means and rotatably supported on an upper portion of said stand so that said cradle is movable up and down in an arcuate path between a substantially horizontal position and a position inclined downwardly and forwardly from said pivot members, and said cradle further including frame means which extends upwardly above said bin supporting and locating means and has a portion above and in substantially vertical alignment with the front end of said bin supporting and locating means in the horizontal position thereof, said frame means being engaged with said bin front wall above said discharge opening to block said bin against forward movement off said supporting and locating means during movement of said cradle, and power operated extensible means connected to and extending between said stand and said cradle, said means being connected at one end thereof to said cradle adjacent the front end of said bin supporting and locating means in a supporting relation with said cradle for moving said cradle upwardly to said substantially horizontal position.

2. The combination according to claim 1 further including hopper means attached to said bin in a position to receive material discharged from said bin through said discharge opening.

3. The combination according to claim 1 further including hopper means having an upwardly inclined open inlet end and gasket means surrounding said inlet end, said hopper means being located with respect to said cradle so that in said downwardly and forwardly inclined position of said cradle said gasket means sealingly engages said bin front wall at a position surrounding said bin discharge opening.

4. Apparatus for tipping to discharge the contents of a bin having legs, a stand having a base and a frame extending upwardly from said base, a bin supporting cradle having a pair of transversely spaced upwardly opening channel tracks having front and rear ends, said tracks being located at the lower end of the cradle and shaped to receive the bin legs, frame means on the cradle connecting said tracks, pivot members secured to said tracks adjacent the rear ends thereof and rotatably supported on the upper end of said frame so that said track members are movable up and down between a substantially horizontal position and a position inclined downwardly and forwardly from said pivot members, a framework on said cradle extending upwardly and having a portion thereof above and in substantially vertical alignment with the front ends of said tracks in the horizontal position thereof, and power operated extensible means connected to and extending between said stand and said cradle, said means being connected at one end thereof to said cradle adjacent the forward ends of said tracks in a supporting relation with said cradle for moving said cradle upwardly to said substantially horizontal position thereof.

References Cited by the Examiner

UNITED STATES PATENTS 1,948,522 2/34 Jacobs _____ 248—130
3,137,402 6/64 Gunn _____ 222—165 X LOUIS J. DEMBO, *Primary Examiner.*

RAPHAEL M. LUPO, *Examiner.*